US008650184B2

(12) United States Patent
Kowalchuk et al.

(10) Patent No.: US 8,650,184 B2
(45) Date of Patent: Feb. 11, 2014

(54) SYSTEM AND METHOD FOR IDENTIFYING A TARGETED CONSUMER (75) Inventors: Craig Kowalchuk, Aurora (CA); Sheldon Smith, Toronto (CA); David Diamond, New York, NY (US); Raymond Ferris, Toronto (CA)

(73) Assignee: Twenty-Ten, Inc., Toronto, Ontario (CA)

( * ) Notice: Subject to any disclaimer, the term of this patent is extended or adjusted under 35 U.S.C. 154(b) by 0 days.

(21) Appl. No.: 13/020,967

(22) Filed: Feb. 4, 2011

(65) Prior Publication Data

US 2012/0203780 A1 Aug. 9, 2012

(51) Int. Cl.
G06F 17/30 (2006.01)
G06F 7/00 (2006.01)

(52) U.S. Cl.
USPC ............. 707/722; 707/732; 707/733; 706/12; 706/13; 706/14

(58) Field of Classification Search
None
See application file for complete search history.

(56) References Cited

U.S. PATENT DOCUMENTS

| 5,041,972 | A | 8/1991 | Frost |
| 6,061,658 | A | 5/2000 | Chou et al. |
| 6,233,564 | B1 | 5/2001 | Schulze, Jr. |
| 6,236,977 | B1 | 5/2001 | Verba et al. |
| 6,285,983 | B1 | 9/2001 | Jenkins |
| 6,286,005 | B1 | 9/2001 | Cannon |
| 6,430,539 | B1 | 8/2002 | Lazarus et al. |
| 6,539,392 | B1 | 3/2003 | Rebane |
| 6,623,040 | B1 | 9/2003 | Foley et al. |
| 6,970,830 | B1 | 11/2005 | Samra et al. |
| 7,472,072 | B2 | 12/2008 | Kowalchuk |
| 7,835,940 | B2 | 11/2010 | Kowalchuk |
| 2005/0177449 | A1* | 8/2005 | Temares et al. ................. 705/26 |
| 2006/0085255 | A1* | 4/2006 | Hastings et al. ................ 705/14 |
| 2006/0143075 | A1* | 6/2006 | Carr et al. ........................ 705/14 |
| 2007/0078869 | A1* | 4/2007 | Carr et al. ..................... 707/100 |
| 2008/0242279 | A1* | 10/2008 | Ramer et al. ............... 455/414.2 |
| 2009/0164308 | A1* | 6/2009 | Kowalchuk .................... 705/10 |
| 2009/0209845 | A1* | 8/2009 | Christen et al. .............. 600/411 |

(Continued)

FOREIGN PATENT DOCUMENTS

WO    WO 9922328    5/1999

OTHER PUBLICATIONS

Ling, C.X., Data Mining for Direct Marketing: Problems and Solutions, The University of Western Ontario, Department of Computer Science, Dec. 1998, pp. 1-7.

(Continued)

Primary Examiner — Angelica Ruiz
(74) Attorney, Agent, or Firm — Reed Smith LLP (57) ABSTRACT A method. The method includes receiving, at a computing device, data associated with a first plurality of consumers. The data comprises a combination of behavioral data and attitudinal data. The method also includes assigning a consumer of the first plurality of consumers to a first respective segments based on the received data, wherein the assigning is performed by the computing device. The method further includes calculating a goodness-of-fit score for the consumer of the first plurality of consumers for the first segment, wherein the calculating is performed by the computing device. Additionally, the method includes calculating a predicted goodness-of-fit score for a consumer of a second plurality of consumers for the first segment, the second plurality of consumers including at least the first plurality of consumers, wherein the calculating is performed by the computing device.

23 Claims, 3 Drawing Sheets

(56) References Cited

U.S. PATENT DOCUMENTS

| | | | |
|---|---|---|---|
| 2010/0082361 A1* | 4/2010 | Dennen et al. | 705/1 |
| 2011/0099045 A1* | 4/2011 | Carr et al. | 705/7.31 |
| 2011/0312310 A1* | 12/2011 | Ramer et al. | 455/414.2 |

OTHER PUBLICATIONS

Seller et al, Center for Research on Information Technology and Organizations, Dec. 1999, eScholarship Repository, University of California, pp. 1-46.

Anand, S.S. et al., A. Data Mining Methodology for Cross-Sales, Oct. 1998, pp. 449-461.

Jackson, et al., Strategic Database Marketing, 1996, NTC Business Books, pp. 89-96, 102-103, 158-159, 161-163 and 168-187.

. . . , Database Marketing: Improving Service and profitability by Segmenting Customer . . . , American Banker, Sep. 1998, vol. 163, Issue 176, Start;. 30A, Retrieved from Proquest Direct.

O'Sullivan, O., Bringing Your Commercial Customer Into Focus, www.banking.com, Jan. 22, 1998, 4 pages Retrieved from: google.com and archive.org.

. . . , Hottest Technology, Computer Business Review, Oct. 1, 1996, vol. 4, No. 10, 2 pages, Retrieved from: Dialog.

Lach, Jennifer, Data Mining Digs in, American Demographics, Jul. 1999, 4 pages, Retrieved from: Dialog.

Kress et al., Forecasting and Market Analysis Techniques, Quorum Books, 1994, pp. 29-54.

Weinstein, A., Market Segmentation, McGraw Hill, 1994, pp. 52-64.

Mugo, F.W., Sampling in Research, http: trochim.human.cornell.edu/tutorial/mugo/tutorial.html, Feb. 10, 1998, pp. 1-8, Retrieved from google.com and archive.org.

Clayton, How to Handle Product Evaluation Procedure, Feb. 1961, National Association of Accountants; Retrieved from ACM Digital Library.

. . . , Database marketing Expands Profitability, Bank Automation News, Aug. 1996, p. 1, Obtained from Proquest Direct.

Tyler, Can My Company Profit from Database Marketing?, Chain Store Age Executive with Shopping Center Age, New York, Mar. 1994, pp. 1-2.

Bort, J., Data Mining's Midas Touch, InfoWorld, Apr. 1996, vol. 18, Issue 18, Start p. 69, Retrieved from Proquest Direct.

Nash, E.L., Database Marketing, the Ultimate Marketing Tool, 1993, McGraw-Hill, Inc., pp. 41-43, 90-91 and 128-163.

* cited by examiner

SYSTEM AND METHOD FOR IDENTIFYING A TARGETED CONSUMER

CROSS-REFERENCE TO RELATED APPLICATION

This application is related to U.S. patent application Ser. No. 12/869,441, to U.S. patent application Ser. No. 12/340,244, now U.S. Pat. No. 7,835,940, to U.S. patent application Ser. No. 10/821,516, now U.S. Pat. No. 7,742,072, and to U.S. patent application Ser. No. 09/511,971, now abandoned.

BACKGROUND

This application discloses an invention which is related, generally and in various embodiments, to a system and method for identifying a targeted consumer based on both behavior and attitudes.

In the quest for new business opportunities, there has been a growing proliferation of products and services seeking to more relevantly satisfy consumer needs. This has heightened competition and furthered a desire by marketers to look for tools that can more precisely identify optimal groups of consumers. Typical targeting methods have used historical information to determine what type of consumer had previously used product/service categories or brands. These factors were used to predict which consumers would likely buy in the future.

The majority of the previous approaches to target marketing prioritized consumers based on category and volume of brand usage. Such consumer targeting efforts are largely based on demographic and geodemographic factors. One approach has been to administer a survey to measure consumer usage levels pertaining to specific products, services and brands. The surveys have also been utilized to gather general demographic information for each respondent. Standard analysis techniques have been applied to study the results and identify optimal demographic segments for targeting marketing efforts. Geodemographic systems have been utilized to categorize the entire marketplace of consumers into a specific number of neighborhood types. These neighborhood types are typically classified according to demographic factors.

Unfortunately, targeting methods based on demographics or geodemographics have several drawbacks. For example, both methods assume that all consumers within a defined demographic or geodemographic sub-set are equally attractive. As such, these methods typically do not distinguish between individual consumers within the same group. In addition, neither method considers attitudinal variables, even though attitudinal variables greatly influence the future purchasing behavior of consumers. Because of these drawbacks, volume-only marketing techniques often do not meet the financial needs or specific marketing objectives of marketers.

To enhance the results generally achieved from the traditional targeting methodologies, some methodologies have also utilized attitudinal filtering. Attitudinal filtering is utilized to identify and reach groups of consumers who tend to "think alike" with respect to their brand and market segment. Examples of such groups, which are divided based on attitudinal variables, include early adopters of high tech consumer products, risk-averse buyers of investment securities, prestige-seeking buyers of luxury automobiles, fashion conscious clothes buyers, etc. Various examples of attitudinal filtering are described in U.S. Pat. No. 7,742,072, assigned to the assignee of the instant patent application.

The grouping of potential customers using attitudinal characteristics and definitions results in segments defined by more than mere demographics and/or behaviors. For example, rather than creating a group of potential luxury car buyers based solely on demographic information like income and past purchases, attitudinally-based segments look to the reasons for purchasing behavior. In this example, instead of merely identifying a group of potential luxury car buyers, the use of attitudinal filtering allows for the grouping of potential luxury car buyers based on the reason for wanting to purchase a luxury car (e.g., seeking prestige, professional appearance, etc.).

In brief, known targeting methodologies which utilize behavioral segmentation to identify a targeted consumer do not take into account the valuable information provided by the consumer's attitudes, and known methodologies which utilize attitudinal segmentation to identify a targeted consumer do not take into account the valuable information provided by the consumer's behavior. Thus, known targeting methodologies would be significantly improved by utilizing both behavioral and attitudinal segmentation criteria to identify one or more targeted consumers.

BRIEF DESCRIPTION OF THE DRAWINGS

Various embodiments of the invention are described herein in by way of example in conjunction with the following figures, wherein like reference characters designate the same or similar elements.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

As described in more detail hereinbelow, aspects of the invention may be implemented by a computing device and/or a computer program stored on a computer-readable medium. The computer-readable medium may comprise a disk, a device, and/or a propagated signal.

Figure 1:
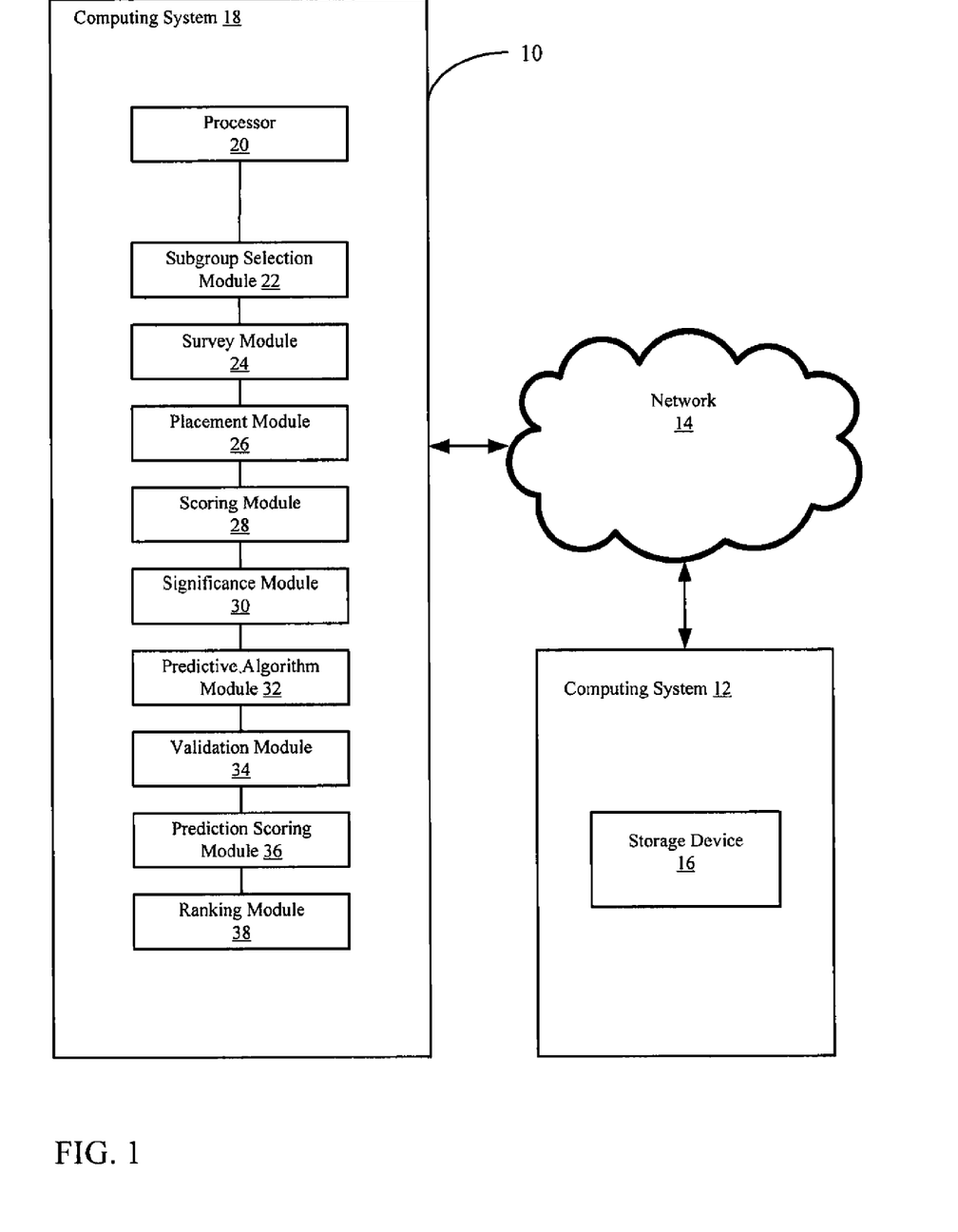
FIG. 1 illustrates various embodiments of a system.

FIG. 1 illustrates various embodiments of a system 10. As explained in more detail hereinbelow, the system 10 may be utilized to determine a likelihood that a particular consumer will take a particular action such as, for example, purchasing a particular product (e.g., a good or a service) within a specified period of time.

As shown in FIG. 1, the system 10 may be communicably connected to a computing system 12 via a network 14. The network 14 may include any type of delivery system including, but not limited to, a local area network (e.g., Ethernet), a wide area network (e.g. the Internet and/or World Wide Web), a telephone network (e.g., analog, digital, wired, wireless, PSTN, ISDN, GSM, GPRS, and/or xDSL), a packet-switched network, a radio network, a television network, a cable network, a satellite network, and/or any other wired or wireless communications network configured to carry data. The network 14 may include elements, such as, for example, intermediate nodes, proxy servers, routers, switches, and adapters configured to direct and/or deliver data. In general, the system 10 may be structured and arranged to communicate with the computer system 12 via the network 14 using various communication protocols (e.g., HTTP, TCP/IP, UDP, WAP, WiFi, Bluetooth) and/or to operate within or in concert with one or more other communications systems.

The computing system 12 may include any number of computing devices communicably connected to one another. The system 10 may also be communicably connected to a storage device 16. According to various embodiments, the system 10 is communicably connected to the storage device 16 via the network 14. As shown in FIG. 1, according to various embodiments, the storage device 16 may form a portion of the computing system 12.

The storage device 16 includes a database having information regarding potential consumers, and such information may be present for any number of potential consumers (e.g., the information is appended to individual records/rows of data in a database table). For example, the information may be present for approximately 85,000,000 potential consumers. The information includes a plurality of data variables for each of the potential consumers, including behavioral variables, attitudinal variables, and non-attitudinal variables. Such consumer data variables may relate to many different types of data. Behavioral variables reflect actions which have been taken by consumers in the past, as well as self-reported propensities to take certain actions in the future. Attitudinal variables reflect attitudes of the consumers such as, for example, brand loyalty, price sensitivity, importance of quality, preference for style, and attraction to brand proposition. Non-attitudinal variables are objective variables of each consumer that are not based on the purchasing attitudes of the consumer. Such non-attitudinal variables include, for example, gender, income, age, home-ownership, parenthood, education, geographic location, ethnicity, etc. The data may be organized into categories such as, for example, lifestyle, demographic, financial, home-ownership, vehicle registration, consumer purchase behavior variables, etc. As the system 10 is communicably connected to the storage device 16, a list of potential consumers, including information associated with the customers, may be accessed by the system 10.

The system 10 includes a computing system 18. The computing system 18 may include any suitable type of computing device (e.g., a server, a desktop, a laptop, etc.) that includes a processor 20. Various embodiments of the computing system 18 are described in more detail hereinbelow with respect to FIG. 2.

According to various embodiments, the system 10 includes the following modules: a subgroup selection module 22, a survey module 24, a placement module 26, a scoring module 28, a significance module 30, a predictive algorithm module 32, a validation module 34, a prediction scoring module 36, and a ranking module 38. Each of the modules 22-38 may be communicably connected to the processor and to one another.

The subgroup selection module 22 is configured to select a subgroup of consumers from a list of consumers. The list of consumers may be accessed, for example, from the database of the storage device 16. The subgroup can be of any size as long it is less than the number of consumers on the list. The subgroup selection module 22 may operate to randomly select the subgroup from the list of consumers. According to various embodiments, the subgroup selection module 22 may also be configured to pre-sort the list of consumers in order to select individuals for the subgroup based on pre-selected variables. The pre-selected variables may be, for example, objective variables. For example, the subgroup selection module 22 may be configured to randomly select a subgroup of individuals in the group of males between 15-24 years of age.

The survey module 24 is configured to create statements and/or questions which are to be presented to the consumers selected for the subgroup. In general, the created statements and/or questions serve to elicit a quantitative response from the subgroup members when the statements and/or questions are presented to the subgroup members. The statements and/or questions are formatted to effectively measure the degree of both behavioral and attitudinal commitment present in each survey respondent. According to various embodiments, the survey module 24 may also be configured to present the statements and/or questions and/or receive the responses thereto. According to various embodiments, the survey module 24 may be external to the system 10 (e.g., the survey module 24 resides at the computing system 12).

The placement module 26 is configured to assign an individual subgroup member (i.e., information associated with the individual subgroup member) to a specific segment based on the member's behavioral and attitudinal characteristics. As indicated hereinabove, the behavioral characteristics include both past actions and future predispositions. The placement module 26 may be configured to assign the subgroup member to the specific segment in a number of different ways.

According to various embodiments, a given segment may be defined based on an ideal consumer target (e.g., consumers who have not bought a new car in over three years and want to buy a new car within a specified period of time), and the placement module 26 may be configured to assign the subgroup member to the defined segment based on a combination of the gathered behavioral and attitudinal data. The gathered data may be gathered via the responses to the statements and/or questions, or via any other suitable means. For example, suppose the following two questions are asked to the consumers selected for the subgroup:

(1) On a scale of 1 to 5, where 1 represents "one year or less" and 5 represents "five years or more", how long has it been since you last purchased a new car?; and (2) On a scale of 1 to 5, where 1 represents "not likely at all" and 5 represents "extremely likely", how likely are you to purchase a new car within the next six months? The placement module 26 may analyze the responses to the questions, then assign the consumers who responded to each question with either 4 or 5 to the segment "consumers who have not purchased a car in over three years and want to purchase a new one". According to various embodiments, the placement module 26 may assign each consumer from the subgroup to the same segment.

According to other embodiments, the placement module 26 may be configured to employ factor analysis and cluster analysis to assign the individual subgroup members to respective segments. For such embodiments, the placement module 26 may be configured to identify a key behavioral dimension based on the gathered behavioral data and a key attitudinal dimension based on the gathered attitudinal data, define a distinct segment based on a combination of the identified behavioral dimension and the identified attitudinal dimension, then assign one or more of the subgroup members to the defined segment. The placement module 26 may be configured to identify a plurality of key behavioral and attitudinal dimensions and to utilize various combinations of the identified key dimensions (as long as the combination includes at least one behavioral dimension and at least one attitudinal dimension) to define a plurality of distinct segments, then assign the subgroup members to the respective segments. The gathered data may be gathered via the responses to the statements and/or questions, or via any other suitable means.

In general, for such other embodiments, the placement module 26 operates to identify responses to individual statements and/or questions which are correlated, and to group together such responses to form the dimensions. Correlation amongst various responses may be determined by looking at exact matches of responses between several subgroup members. The placement module 26 may then operate to define the distinct segments based on the dimensions, then to apply various statistical techniques to assign the subgroup members to the respective segments. According to various embodiments, the subgroup members are assigned to a given segment by grouping together individuals whose survey response patterns are characterized by at least two elements of homogeneity. Any number of elements of homogeneity may be employed, as judged against the total surveyed population. According to various embodiments, the placement module 26 may also be configured to identify groups of individuals whose response patterns are as mutually exclusive as possible from members of other segments.

The scoring module 28 is configured to calculate a goodness-of-fit score for each individual in the subgroup for each segment. Thus, if there are ten segments, the scoring module 28 will calculate ten goodness-of-fit scores for each subgroup member. In general, a given goodness-of-fit score is based on the degree of fit between a given subgroup member and a given segment, and the respective goodness-of-fit scores calculated by the scoring module 28 serve to illustrate distinctions between the various subgroup members. Thus, although a number of subgroup members may be assigned to a given segment, the respective degrees of fit between the given segment and all subgroup members may vary.

According to various embodiments, the scoring module 28 is configured to calculate a goodness-of-fit score based on combined behavioral and attitudinal data from different survey questions. For example, a user may want to identify consumers who are really attracted to buying the softest bathroom tissue (M1), and the user does not currently use brand X bathroom tissue (M2). In order to facilitate the combining of different questions/statements that have different response scales, the responses may be normalized to avoid potential scale-of-size influence. Once the responses are normalized, various linear and exponential weighting schemes can then be used to combine responses to questions that pertain to the target segment in order to emphasize specific target elements and define a goodness-of-fit score.

For example, according to various embodiments, a given goodness-of-fit score may be represented by any of the following:

$$\text{Goodness-of-fit} = (M1+M2)/2$$

$$\text{Goodness-of-fit} = [(W1*M1)+(W2*M2)]/2$$

where M1-M2 are as described above, and W1-W2 are weights such that their sum is zero.

The significance module 30 is configured to determine which non-attitudinal variables (independent variables) that are appended to the database records of the subgroup members are strongly correlated to the goodness-of-fit scores (dependent variables) for a given target segment. The significance module 30 is configured to take into account the statistical reliability of the correlation. For example, the reliability of the statistical correlation may be determined based on the sample size of the survey file being analyzed (that includes the goodness-of-fit scores), and may also take into account the cross-correlation between different independent variables. According to various embodiments, only those non-attitudinal variables determined to be strongly correlated to the goodness-of-fit scores are utilized to generate predictive algorithms as described in more detail hereinbelow. The significance module 30 may also be configured to determine the correlation strength (significance) for one or more tolerance levels.

According to various embodiments, the non-attitudinal variables that have been appended to the database records of the subgroup members may be classified prior to the correlation performed by the significance module 30. The classifications may be performed manually or by a module of the system 10. For example, for such embodiments, the non-attitudinal variables may be classified as either (1) continuous non-attitudinal variables (e.g., can be expressed on a continuous scale such as age, percentages, $ amounts, etc.), (2) dichotomous non-attitudinal variables (e.g., are expressed as on or off, one or zero, etc.), or (3) categorical non-attitudinal variables (e.g., are nominal or descriptive such as type of house, area of country, occupation, etc.). For such embodiments, the significance module 30 is configured to take into account the type or class of each variable each independent variable represents (e.g., binary, etc.), and output a set of independent "candidate" modeling variables that are considered statistically significant or meaningful in their strength of correlation or relationship with the dependent variable (goodness-of-fit) score. The significance module 30 may utilize Pearson Correlation for the continuous variables, and one-way analysis of variance (ANOVA) for dichotomous variables and categorical variables.

According to various embodiments, in addition to the above-described functionality, the significance module 30 may be further configured to (1) test certain individual non-attitudinal variables (independent variables) to create a shadow or composite variable that represents a linear or smoother relationship between each categorical variable used to create the composite variable and the specific dependent variable and (2) determine which composite variables are strongly correlated to the goodness-of-fit scores (dependent variables) for a given target segment. This functionality operates to stabilize and enhance the potential utility of specific non-attitudinal variables whose statistical significance is considered too unstable due to smaller sample sizes experienced in specific projects. The product of this functionality is a composite variable which comprises a combination of individual non-attitudinal variables (which are highly correlated to each other as well as highly correlated with the dependent variable). The combining may be performed in an additive way, where subgroup members who have more than one of the highly correlated non-attitudinal characteristics (from the set which is being composited) will reflect a higher value for the composite variable.

For example, assume that there are three non-attitudinal variables (Income, Education and Net Worth) that have been determined to be highly correlated with each other. The three non-attitudinal variables may be normalized, then combined into a set to create one composite variable. The normalized values may be combined for two different subgroup members as follows:

| Subgroup member A | | |
|---|---|---|
| | | Normalized Value of Non-Attitudinal Variable |
| Income | $150,000 or more | 0.70 |
| Education | Completed Graduate School | 0.67 |
| Net Worth | $1,000,000-$1,500,000 | 0.24 |
| additive composite variable value | | 1.61 |

| Subgroup member B | | |
|---|---|---|
| | | Normalized Value of Non-Attitudinal Variable |
| Income | $150,000 or more | 0.70 |
| Education | Completed High School | 0.40 |
| Net Worth | $250,000-$300,000 | 0.24 |
| additive composite variable value | | 1.34 |

It will be appreciated that the methodology for combining categorical variables with continuous variables, categorical variables with dichotomous variables, etc. to generate composite variables will differ from the additive examples shown above.

The predictive algorithm module 32 is configured to generate, for each segment, an algorithm which predicts the goodness-of-fit scores previously calculated for each of the subgroup members who are assigned to that segment. Thus, the predictive algorithm module 32 may be utilized to generate a different algorithm for each segment. According to various embodiments, when more than one goodness-of-fit score is determined for a given segment, the predictive algorithm module 32 may be configured to generate more than one algorithm per segment. The respective algorithms may be generated in any suitable manner.

According to various embodiments, the database records associated with the subgroup members are separated into first and second portions. The size of the first and second portions are generally different, and the respective sizes may differ by any amount. For example, according to some embodiments, the first portion represents 66% of all the database records of the subgroup members and the second portion represents 34% of all the database records of the subgroup members. For purposes of simplicity, the first portion will hereinafter be referred to as the larger portion and the second portion will hereinafter be referred to as the smaller portion. The predictive algorithm model 32 utilizes the segment specific non-attitudinal variables that are determined as "candidate" variables (e.g., by the significance module 30) of the larger portion of the database records to generate the respective algorithms. According to various embodiments, the previously calculated goodness-of-fit scores of the subgroup members associated with the larger portion of the database records are employed as dependent variables, then regression techniques (e.g., step-wise linear regression, logistic regression, etc.) are applied to realize the respective algorithms. According to various embodiments, the predictive algorithm module 32 may be external to the system 10 (e.g., the predictive algorithm module 32 resides at the computing system 12).

The validation module 34 is configured to determine whether the performance of a predictive algorithm generated by the algorithm prediction module 32 is sufficiently acceptable. The predictive algorithm may be considered sufficiently acceptable (validated) when its application to the larger portion produces an improvement (e.g., % lift) in identifying consumers with the target segment profile or traits that a client/brand is looking for which is comparable to an improvement produced by its application to the smaller portion. According to various embodiments, the improvements determined for the larger portion and the improvements determined for the smaller portion may be considered comparable if they are within a certain range of tolerance (e.g., + or −20%).

According to various embodiments, the validation module 34 is configured to perform the following actions: (1) apply the predictive algorithm to the larger portion of the database records to generate goodness-of fit scores for each subgroup member associated with the larger portion; (2) rank each subgroup member (e.g., from high to low) based on the goodness-of-fit score determined by the predictive algorithm; (3) divide the larger portion into a plurality of equal-sized groupings (e.g., ten groupings); (4) determine the percentage of subgroup members who share the combined behavioral/attitudinal profile being targeted; (5) determine the improvement (e.g., % lift) in identifying consumers with the target segment profile or traits that a client/brand is looking for; (6) repeat steps (1)-(5) using the smaller portion; and (7) compare the improvement for the larger portion with the improvement for the smaller portion. As more than one predictive algorithm may be generated for a given segment, the validation module 34 may determine the performance (e.g., % lift) of each of the generated predictive algorithms for a given segment.

The prediction scoring module 36 is configured to calculate, for each segment, a predicted goodness-of-fit score for each consumer listed in the database of the storage device 16. Thus, the prediction scoring module 36 may be utilized to calculate a plurality of predicted goodness-of-fit scores for each consumer listed in the database of the storage device 16. In general, the prediction scoring module 36 utilizes the segment specific algorithms generated by the predictive algorithm module 32 to calculate the respective segment specific predicted goodness-of-fit scores. Thus, for embodiments where more than one predictive algorithm per segment was generated, the prediction scoring module 36 may calculate more than one predicted goodness-of-fit score (one for each predictive algorithm) per segment for a given consumer listed in the database. According to other embodiments, even if more than one predictive algorithm per segment was generated, the prediction scoring module 36 may be configured to only calculate one predicted goodness-of-fit score (utilizing the predictive algorithm having the highest determined % lift) per segment for a given consumer listed in the database. According to various embodiments, the higher a given predicted goodness-of-fit score, the better the fit within the particular segment.

The ranking module 38 is configured to rank, on a segment by segment basis, the consumers listed in the database based on the predicted goodness-of-fit scores calculated by the prediction scoring module 36. For embodiments where more than one goodness-of-fit score was calculated for each consumer for a given segment (due to more than one predictive algorithm being utilized), the ranking module 38 is further configured to rank the goodness-of-fit scores on an "algorithm-by-algorithm" basis within the segment. According to various embodiments, the ranking may be ordered from highest to lowest within a given segment. According to other embodiments, the ranking may be ordered from lowest to highest within a given segment. It will be appreciated that a first ranking based on predicted goodness-of-fit scores calculated using a first algorithm for a given segment may be different than a second ranking based on predicted goodness-of-fit scores calculated using a second algorithm for the given segment. In general, the rankings indicate the relative likelihood that a given consumer will take a particular action such as, for example, purchasing a particular product (e.g., a good or a service) within a specified period of time.

The modules 22-38 may be implemented in hardware, firmware, software and combinations thereof. For embodiments utilizing software, the software may utilize any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. The modules 22-38 (e.g., software application, computer program) may be stored on a computer-readable medium (e.g., disk, device, and/or propagated signal) such that when a computer reads the medium, the functions described herein are performed. According to various embodiments, the above-described functionality of the modules may be combined into fewer modules, distributed differently amongst the modules, spread over additional modules, etc.

Figure 2:
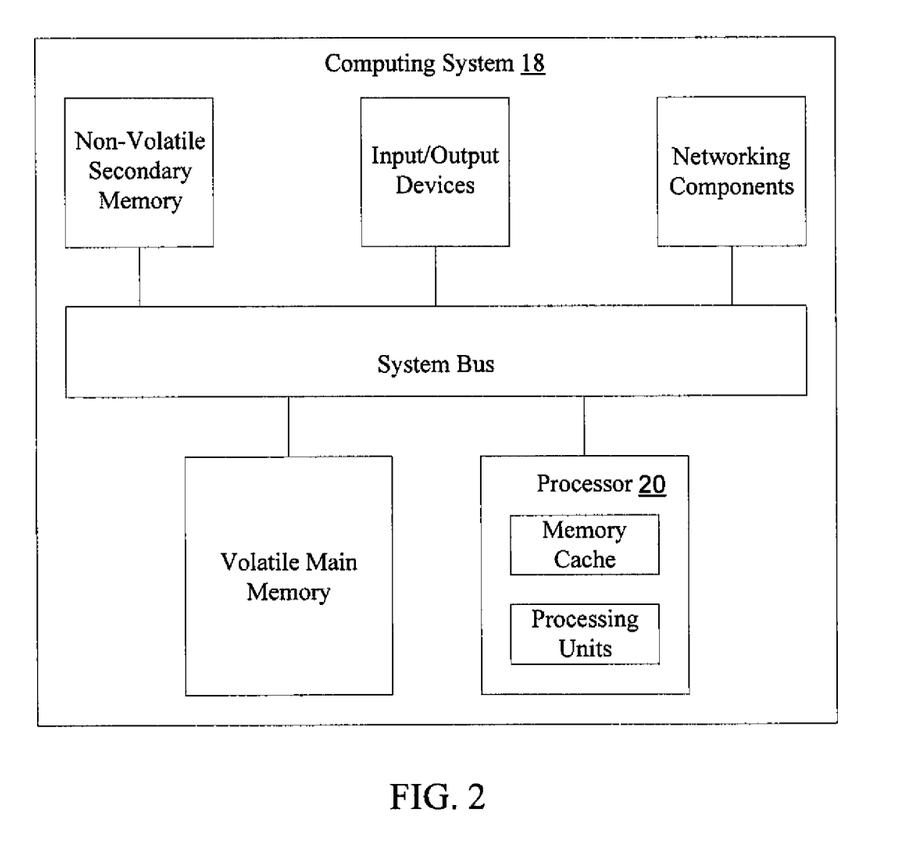
FIG. 2 illustrates various embodiments of a computing system of the system of FIG. 1.

FIG. 2 illustrates various embodiments of the computing system 18. The computing system 18 may be embodied as one or more computing devices, and includes networking components such as Ethernet adapters, non-volatile secondary memory such as magnetic disks, input/output devices such as keyboards and visual displays, volatile main memory, and a processor 20. Each of these components may be communicably connected via a common system bus. The processor 20 includes processing units and on-chip storage devices such as memory caches.

According to various embodiments, the computing system 18 includes one or more modules which are implemented in software, and the software is stored in non-volatile memory devices while not in use. When the software is needed, the software is loaded into volatile main memory. After the software is loaded into volatile main memory, the processor 20 reads software instructions from volatile main memory and performs useful operations by executing sequences of the software instructions on data which is read into the processor 20 from volatile main memory. Upon completion of the useful operations, the processor 20 writes certain data results to volatile main memory.

Figure 3:
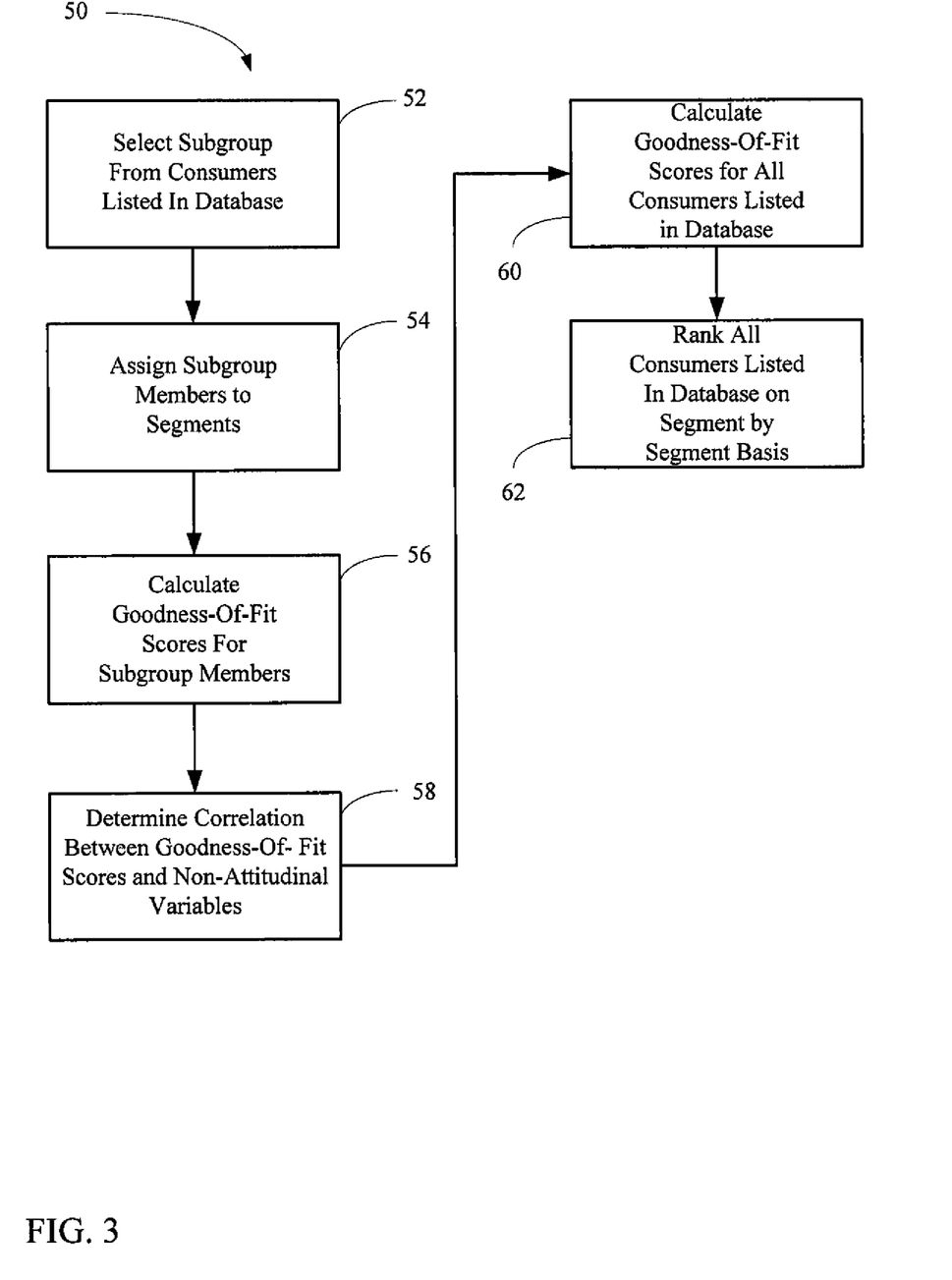
FIG. 3 illustrates various embodiments of a method.

FIG. 3 illustrates various embodiments of a method 50. As explained in more detail hereinbelow, the method 50 may be utilized to determine a likelihood that a particular consumer will take a particular action such as, for example, purchasing a particular product (e.g., a good or a service) within a specified period of time. According to various embodiments, the method 50 may be implemented by the system 10. For purposes of simplicity, the method 50 will be described in the context of its implementation by the system 10. However, it will be appreciated that the method 50 may be implemented by any number of different systems.

Prior to the start of the process, a large amount of information associated with potential consumers is developed and organized as a database residing at storage device 16. In general, the information includes a plurality of data variables for each potential customer. The information may include any number of such data variables, including behavioral variables, attitudinal variables, and non-attitudinal variables. Such data variables may relate to any number of different types of data. The data variables may be organized into categories such as, for example, lifestyle, demographic, financial, home-ownership, vehicle registration, consumer purchase behavior variables, etc. A person skilled in the art will appreciate that the database may include many different types of consumer data variables. For example, according to various embodiments, the developed database has lifestyle and demographic variables for over 85,000,000 individual consumers.

Additionally, both behavioral attributes and attitudinal attributes which are important to a particular manufacturer, distributor retailer, etc. are determined. According to other embodiments, the behavioral and attitudinal attributes may be determined after the start of the process. Examples of such behavioral attributes include, but are not limited to: (1) the length of time which has passed since a particular product was last purchased; (2) the length of time until the product will most likely be purchased again; etc. Examples of attitudinal attributes include, but are not limited to: (1) importance of quality over price; (2) importance of price sensitivity in home computers; (3) importance of brand name appeal to the consumer; (4) preference for powerful cars over economy cars; (5) brand name loyalty; (6) importance of value/price; (7) perceived status/image of customer for using or wearing a brand name product; (8) importance of style/fashion; (9) technology loving/hating; (10) importance of convenience in selecting a retailer; etc. It will be appreciated that other attributes that are based on the attitudes that consumers have when making the decision to purchase products or services may also be determined to be important attitudinal attributes. Thus, it will be appreciated that the attributes determined to be important are not solely based on behavior (e.g., purchase volume history), but may also be based on an expressed future predisposition of the consumer and an expressed attitude of the consumer.

Also prior to the start of the process, a survey is created which includes statements/questions which are based on the combination of behavioral and attitudinal attributes determined to be important to the particular manufacturer, distributor retailer, etc. According to other embodiments, the survey may be created after the start of the process. As described in more detail hereinbelow, the statements/questions are eventually presented to a plurality of potential consumers. The survey may be conducted, for example, by presenting various statements/questions to the potential consumers and asking them, for each presented statement/question, to rate their level of agreement on a 5 point scale, where 1 represents "completely disagree" and 5 represents "completely agree". The survey may also be conducted, for example, by presenting a set of statements to the potential consumers, and asking them to identify which statement is most important in their purchase decision and which one is least. According to various embodiments, the survey module 24 is utilized to generate the statements/questions, present them to the potential consumers, and/or receive the responses from the potential consumers.

The process starts at block 52, where the subgroup selection module 22 selects a plurality of names of potential consumers from the information included in database. Collectively, the selected names represent a subgroup of all the potential consumers who have information associated with them included in the database. The subgroup selection module 22 may select the subgroup in any suitable manner. For example, according to various embodiments, the subgroup selection module 22 randomly selects the subgroup from the overall group of consumers who have information associated with them included in the database. The selected subgroup may be of any suitable size. For example, according to various embodiments, the subgroup includes approximately 20,000 people. According to various embodiments, the subgroup selection module 22 may also pre-sort the overall group of potential customers based on pre-selected variables (e.g., objective variables) before selecting the subgroup. For example, the subgroup selection module 22 may pre-sort the overall group of potential customers into potential customers who are males between the ages of 15-24, then randomly select the subgroup from the pre-sorted group.

From block 52, the process advances to block 54, where the placement module 26 "assigns" each subgroup member (e.g., assigns information associated with the subgroup member) to a segment based on a combination of behavioral and attitudinal criteria. According to various embodiments, each individual subgroup member is assigned to the same segment. According to other embodiments, different subgroup members are assigned to different segments. Thus, it will be appreciated that some subgroup members may be assigned to a first segment, other subgroup members are assigned to a second segment, etc.

From block 54, the process advances to block 56, where the scoring module 28 calculates goodness-of-fit scores for the subgroup members. A goodness-of-fit score is calculated for each individual in the subgroup for each segment. According to various embodiments, a given goodness-of-fit score is based on the degree of fit between a given subgroup member and a given segment. Thus, the respective goodness-of-fit scores calculated by the scoring module 28 may serve to illustrate distinctions between the various subgroup members. For example, the respective goodness-of-fit scores may serve to illustrate distinctions between subgroup members who fit perfectly in a given segment, fit very closely in a given segment, do not fit very closely in a given segment, those who have behaviors, future predispositions and/or attitudes opposite to members in a given segment, etc.

The goodness-of-fit scores may be calculated in any suitable manner. For example, according to various embodiments, the goodness-of-fit scores may be determined in the following manner. For an instance where the desired target segment is consumers who want to buy the softest toilet tissue (attitudinal) and shop at Walmart frequently (behavioral), potential targets may be asked to respond to the following:

(a) "Using a 5 point scale where "1" means that you totally disagree and "5" means that you totally agree, please indicate how much you agree or disagree with the following statement: Using the softest toilet tissue that you can buy is extremely important to me."; and (b) How many times have you shopped at a Walmart store in the past three months?"

Now assume that four different potential targets (PT1-PT4) responded as shown below:

| | | | | |
|---|---|---|---|---|
| PT1 | (a) | 5 | (b) | 2 |
| PT2 | (a) | 3 | (b) | 4 |
| PT3 | (a) | 1 | (b) | 1 |
| PT4 | (a) | 2 | (b) | 0 |

Given the above responses, a combined dependent variable that grants higher scores to potential targets consumers who exhibit more of both the desired attitudinal and behavioral profile may be established by the following methodology. For each potential target who responded, multiply the two respective values (a*b) to yield the dependent modeling variable values (combined attitudinal/behavioral) listed below:

| | |
|---|---|
| PT1 | 10 |
| PT2 | 12 |
| PT3 | 1 |
| PT4 | 0 |

In this example, PT2 is the most attractive potential target because PT2 has more of both the desired attitudinal and behavioral characteristics. The goodness-of-fit scores as determined in this example may then be used as the dependent variables by the predictive algorithm module 32 to generate the predictive algorithms as described hereinabove.

According to other embodiments, a weighting associated with the variable which is deemed to be more important may be added to the product a*b to determine the most attractive potential target. For example, if the attitudinal "softest" characteristic is deemed to be more important than the behavioral "shopped at Walmart" characteristic, the product of a*b may be increased by adding, for example, 200% of the value of the attitudinal statement (a) so that the product of [(a*b)+2a] yields the dependent modeling variable values (combined attitudinal/behavioral) listed below:

| | |
|---|---|
| PT1 | 20 |
| PT2 | 18 |
| PT3 | 3 |
| PT3 | 4 |

In this weighting example, PT1 is the most attractive potential target, and it is readily apparent how weighting the value of the attitudinal statement (a) makes the attitudinal variable more powerful in the calculation. The goodness-of-fit scores as determined in this example may then be used as the dependent variables by the predictive algorithm module 32 to generate the predictive algorithms as described hereinabove. Of course, it will be appreciated that any number of different ways may be utilized to calculate the respective goodness-of-fit scores.

From block 56, the process advances to block 58, where the significance module 30 determines which non-attitudinal variables that are appended to the database records of the subgroup members (and/or which associated composite variables) are strongly correlated to the goodness-of-fit scores for a given target segment. This determination identifies a set of non-attitudinal variables (and/or composite variables) that are considered statistically significant or meaningful in their strength of correlation or relationship with the goodness-of-fit scores.

According to various embodiments, after the correlations amongst the non-attitudinal variables (and/or composite variables) and the goodness-of-fit scores are determined at block 58, the predictive algorithm module 32 may utilize the segment specific non-attitudinal variables (and/or composite variables) to generate one or more predictive algorithms for each segment. The generated algorithms operate to predict the goodness-of-fit scores previously calculated for each of the subgroup members at block 56.

The predictive algorithm module 32 may generate the algorithms in any suitable manner. According to various embodiments, the predictive algorithms are generated based on values determined for various non-attitudinal variables (and/or composite variables). The predictive algorithm module 32 may utilize non-attitudinal variables (and/or composite variables) as the independent variables and the calculated goodness-of-fit scores of the individual subgroup members as dependent variables to generate the algorithms. Table 1 shows nine exemplary non-attitudinal variables that could apply to a given segment. These non-attitudinal variables may be included in the database.

TABLE 1

| Name of Non-Attitudinal Variable | Variable Configuration | Value for an Individual |
|---|---|---|
| 1) Value of home | Expressed as an index: ($ value of individual's home/average value of neighborhood homes × 100) | 147 |
| 2) Time in current residence | Years | 5 |
| 3) Purchase beauty aids | "yes" = 1; "no" = 0 | 0 |
| 4) Subscribe to a fitness magazine | "yes" = 1; "no" = 0 | 1 |
| 5) Read the Bible | "yes" = 1; "no" = 0 | 0 |
| 6) Surf the internet | "yes" = 1; "no" = 0 | 1 |
| 7) Purchase by mail order | "yes" = 1; "no" = 0 | 0 |
| 8) Donate to environmental causes | "yes" = 1; "no" = 0 | 0 |
| 9) Age 18-24 | "yes" = 1; "no" = 0 | 1 |

According to various embodiments, a given algorithm generated by the predictive algorithm module 32 may be represented by the following equation (1) where the term "probability" refers to the goodness-of-fit score:

$$\text{Probability} = \frac{\begin{array}{l} 33.47 + 0.68\left(\begin{array}{l}\text{Value} \\ \text{of} \\ \text{Home}\end{array}\right) - 0.94\left(\begin{array}{l}\text{Time\_in} \\ \text{Current} \\ \text{Residence}\end{array}\right) - 13.5\left(\begin{array}{l}\text{Purchases} \\ \text{Beauty} \\ \text{Aids}\end{array}\right) + 17.71\left(\begin{array}{l}\text{Subscribes} \\ \text{to\_Fitness} \\ \text{Magazine}\end{array}\right) - \\ 14.36\left(\begin{array}{l}\text{Reads} \\ \text{the} \\ \text{Bible}\end{array}\right) + 10.00\left(\begin{array}{l}\text{Surfs} \\ \text{the} \\ \text{Internet}\end{array}\right) - 20.94\left(\begin{array}{l}\text{Purchases} \\ \text{By\_Mail} \\ \text{Order}\end{array}\right) + 9.07\left(\begin{array}{l}\text{Donates\_to} \\ \text{Environmental} \\ \text{Causes}\end{array}\right) + 11.67\left(\begin{array}{l}\text{Age} \\ 18 - \\ 24\end{array}\right) \end{array}}{100} \quad (1)$$

where the values of the non-attitudinal variables from Table 1 are inserted into the equation to calculate the goodness-of-fit score for the given individual for the given segment. Equation (1) is shown below with the inserted values as equation (2):

$$\text{Probability} = \frac{33.47 + 0.68(147) - 0.94(5) - 13.5(0) + 17.71(1) - 14.36(0) + 10.00(1) - 20.94(0) + 9.07(0) + 11.67(1)}{100} \quad (2)$$
$$= 78.146\%$$

According to other embodiments, a given predictive algorithm may be represented by an equation which only includes the numerator of equation (1).

Additionally, the validation module 34 may utilize the larger and smaller portions of the database to determine whether the performance of each of the respective predictive algorithms generated by the algorithm prediction module 32 is sufficiently acceptable. As described hereinabove, the validation module 34 may determine the performance (e.g., % lift) for more than one predictive algorithm per segment. According to various embodiments, for a given segment, only the predictive algorithm having the highest % lift in the given segment is utilized going forward in the process. According to other embodiments, the process going forward may be expanded to utilize each of the predictive algorithms. For purposes of simplicity, the rest of the process will be described in the context of only utilizing, for a given segment, the predictive algorithm determined to have the highest % lift of the predictive algorithms generated for the segment.

From block 58, the process advances to block 60, where the prediction scoring module 36 utilizes the predictive algorithms having the highest % lift to calculate, for each segment, a goodness-of-fit score for each consumer listed in the database of the storage device 16. A given goodness-of-fit score calculated for a given consumer for a given segment at block 60 is a representation of that consumer's degree of fit with the given segment. Of course, according to various embodiments, all of the predictive algorithms, including those not having the highest % lift, may be utilized to calculate goodness-of-fit scores for each consumer.

From block 60, the process advances to block 62, where the ranking module 38 ranks, on a segment by segment basis, all of the consumers listed in the database based on the goodness-of-fit scores calculated by the prediction scoring module 36 at block 60. Of course, according to various embodiments, when more than one goodness-of-fit score is calculated at block 60 for a given segment for each consumer, the ranking module 38 may generate a plurality of rankings for a given segment. For example, if the prediction scoring module 36 utilizes three different predictive algorithms to generate three goodness-of-fit scores for a given segment for each consumer, the ranking module 38 may generate three different rankings for the given segment.

In general, the rankings represent the relative likelihood that that the consumers will take a particular action such as, for example, purchasing a particular product (e.g., a good or a service) within a specified period of time. Thus, it will be appreciated how the rankings could be utilized to identify a target list of potential consumers for given manufacturer, distributor, retailer, etc., where the target list includes fewer potential consumers than the number of potential consumers associated with the database. For example, according to various embodiments, the identified target list represents about 5% to 25% of all of the consumers listed in the database. However, it will be appreciated that the size of the target list may vary depending on marketing requirements and the level of predictive accuracy that is acceptable to a given manufacturer, distributor, retailer, etc. The process described at blocks 52-62 may be repeated any number of times.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the described invention. Accordingly, it is understood that the drawings and the descriptions herein are proffered only to facilitate comprehension of the invention and should not be construed to limit the scope thereof.

What is claimed is:

1. A system, comprising:
a computing device, wherein the computing device comprises:
 a processor;
 a subgroup selection module communicably connected to the processor, wherein the subgroup selection module is configured to select a subgroup of consumers from a list of consumers;
 a placement module communicably connected to the processor, wherein the placement module is configured to assign a consumer of the subgroup to a first segment based on information associated with the consumer, the information comprising a combination of behavioral data and attitudinal data, wherein:
  the behavioral data is associated with behavior of the consumer; and
  the attitudinal data is associated with an attitude of the consumer expressed in one or more survey responses;
 a scoring module communicably connected to the processor, wherein the scoring module is configured to calculate a goodness-of-fit score for the consumer of the subgroup for the first segment; and
 a scoring prediction module communicably connected to the processor, wherein the scoring prediction module is configured to calculate a predicted goodness-of-fit score for another consumer from the list of consumers.

2. The system of claim 1, wherein the behavioral data comprises data indicative of an actual past behavior associated with the consumer.

3. The system of claim 1, wherein the behavioral data comprises data indicative of a self-reported future predisposition associated with the consumer.

4. The system of claim 1, wherein the behavioral data comprises a combination of:
 data indicative of an actual past behavior associated with the consumer; and
 data indicative of a self-reported future predisposition associated with the consumer.

5. The system of claim 1, wherein the placement module is further configured to identify:
 at least one behavioral dimension based on the behavioral data; and
 at least one attitudinal dimension based on the attitudinal data.

6. The system of claim 5, wherein the placement module is further configured to define different segments based on different combinations of behavioral and attitudinal dimensions.

7. The system of claim 1, further comprising a survey module communicably connected to the processor, wherein the survey module is configured to perform at least one of the following:
 create statements and questions which are to be presented to the consumers selected for the subgroup; and
 receive data associated with responses to the statements and questions.

8. The system of claim 1, further comprising a significance module communicably connected to the processor, wherein the significance module is configured to determine a correlation between the goodness-of-fit score and one or more non-attitudinal variables associated with the consumer of the subgroup.

9. The system of claim 1, further comprising a predictive algorithm module communicably connected to the processor, wherein the predictive algorithm module is configured to generate an algorithm which predicts the goodness-of-fit score calculated for the consumer of the first subgroup for the first segment.

10. The system of claim 1, further comprising a validation module communicably connected to the processor, wherein the validation module is configured to determine a performance of a predictive algorithm.

11. The system of claim 1, further comprising a ranking module communicably connected to the processor, wherein the ranking module is configured to rank, on a segment by segment basis, the consumers on the list of consumers based on the predicted goodness-of-fit scores calculated by the scoring prediction module.

12. A method, comprising:
 receiving, at a computing device, data associated with a first plurality of consumers, wherein said data comprises a combination of behavioral data and attitudinal data, wherein:
  the behavioral data is associated with one or more behaviors of the consumers; and
  the attitudinal data is associated with one or more attitudes of the consumers expressed in one or more survey responses;
 assigning a consumer of the first plurality of consumers to a first segment based on the received data, wherein the assigning is performed by the computing device;
 calculating a goodness-of-fit score for the consumer of the first plurality of consumers for the first segment, wherein the calculating is performed by the computing device; and
 calculating a predicted goodness-of-fit score for a consumer of a second plurality of consumers for the first segment, the second plurality of consumers including at least the first plurality of consumers, wherein the calculating is performed by the computing device.

13. The method of claim 12, wherein receiving the combination of behavioral data and attitudinal data comprises receiving:
 data indicative of an actual past behavior associated with the first plurality of consumers; and
 attitudinal data associated with the first plurality of consumers.

14. The method of claim 12, wherein receiving the combination of behavioral data and attitudinal data comprises receiving:
 data indicative of a self-reported future predisposition associated with the first plurality of consumers; and
 attitudinal data associated with the first plurality of consumers.

15. The method of claim 12, wherein receiving the combination of behavioral data and attitudinal data comprises receiving:
 data indicative of an actual past behavior associated with the first plurality of consumers;
 data indicative of a self-reported future predisposition associated with the first plurality of consumers; and
 attitudinal data associated with the first plurality of consumers.

16. The method of claim 12, wherein assigning the consumer comprises assigning the consumer based on the following:
- at least one behavioral dimension associated with the received data; and
- at least one attitudinal dimension associated with the received data.

17. The method of claim 12, wherein calculating the goodness-of-fit score comprises calculating the goodness-of-fit score based on at least one dimension associated with the received data.

18. The method of claim 12, wherein calculating the predicted goodness-of-fit score comprises calculating the predicted goodness-of-fit score utilizing a predictive algorithm.

19. The method of claim 12, further comprising defining:
- at least one behavioral dimension based on the received data; and
- at least one attitudinal dimension based on the received data, wherein the defining is performed by the computing device.

20. The method of claim 12, further comprising defining the first segment based on the following:
- the received behavioral data; and
- the received attitudinal data, wherein the defining is performed by the computing device.

21. The method of claim 12, further comprising determining a correlation between the goodness-of-fit score and one or more non-attitudinal variables associated with the consumer of the first plurality of consumers, wherein the determining is performed by the computing device.

22. The method of claim 21, wherein determining the correlation comprises determining a cross-correlation between different non-attitudinal variables.

23. The method of claim 12, further comprising validating a performance of a predictive algorithm, wherein the validating is performed by the computing device.

* * * * *